Feb. 13, 1923.     W. M. GRANT.     1,445,582.
EGG TURNER.
FILED JAN. 3, 1922.
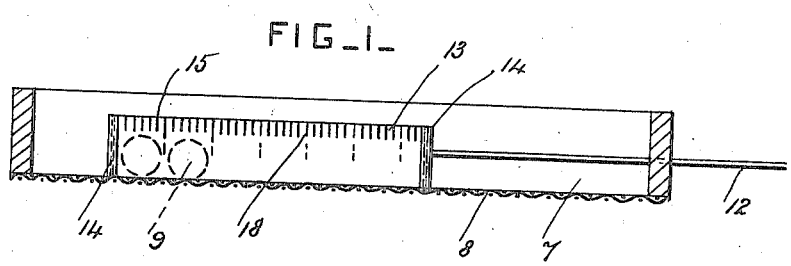
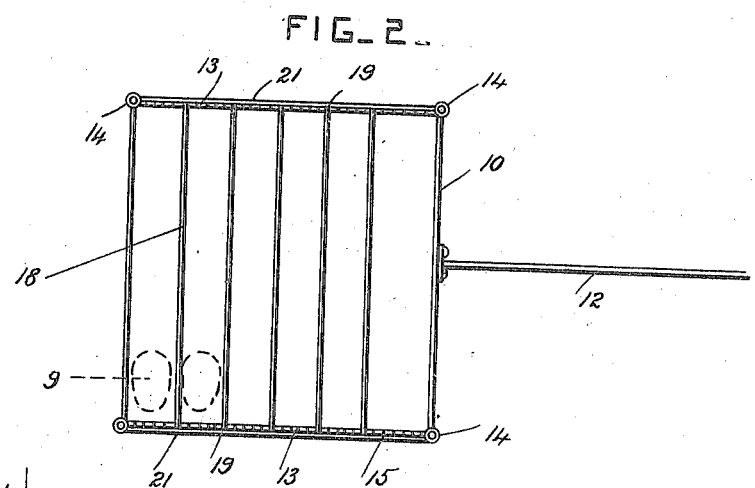
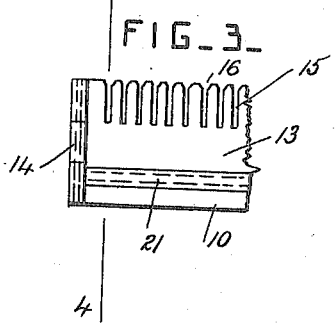
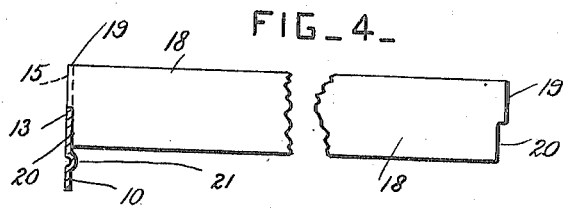
Inventor
William M. Grant
by Herbert W. T. Jenner
Attorney.

Patented Feb. 13, 1923.

1,445,582

UNITED STATES PATENT OFFICE.

WILLIAM M. GRANT, OF STONINGTON, COLORADO.

EGG TURNER.

Application filed January 3, 1922. Serial No. 526,716.

*To all whom it may concern:*

Be it known that I, WILLIAM M. GRANT, a citizen of the United States, residing at Stonington, in the county of Baca and State of Colorado, have invented certain new and useful Improvements in Egg Turners, of which the following is a specification.

This invention relates to devices for turning eggs in incubators so that the eggs may be uniformly heated on all sides; and it consists in the novel construction and combination of the parts hereinafter fully described and claimed.

In the drawings, Figure 1 is a side view of the egg turner, showing the egg tray in section. Fig. 2 is a plan view of the egg turner removed from the egg tray. Fig. 3 is a detail side view of a portion of one side of the egg turner. Fig. 4 is a section, taken on the line 4—4 in Fig. 3, and showing also one partition plate.

The egg tray consists of a rectangular frame 7 having a reticulated or perforated bottom 8, which may advantageously be formed of woven wire, so that hot air may pass upwardly through it to hatch the eggs 9 which rest on it.

In order to turn the eggs from time to time a slidable frame 10 is arranged inside the frame 7, and has a handle 12 for reciprocating it. This frame is preferably foldable, and its ends and sides are connected together by hinges 14. The sides 13 of the frame 10 have a series of vertical slots 15, and the tops of the slots have enlarged entrances 16 formed by cutting off the corner portions of the metal.

A series of partition plates 18 is provided, and each partition plate has lugs 19 at the upper parts of its ends 20, which are dropped interchangeably into any of the slots 15, so that its ends 20 bear against the sides 13 of the frame 10. The sides of the frame 10 have also horizontal stiffening ribs 21 below the bottoms of the slots, said ribs being preferably formed of corrugations or creases in the metal.

The eggs are placed between the partitions, and are turned by frictional engagement with the bottom of the egg tray, by sliding the frame 10 in the egg tray by means of the handle.

The partition plates can be removed and replaced in the slots, and can be arranged at different distances apart to suit eggs of different size. The egg turning frame 10 with its partition plates can be folded flat, and is adapted to be sent through the mail, and may be applied to the egg tray of any incubator.

What I claim is:

1. An egg turner for use in an incubator tray, comprising a rectangular frame open at top and bottom and having a series of parallel vertical slots in the upper parts of its sides, and a series of removable partition plates having lugs at the upper parts of their ends adapted to be slid interchangeably into any of the said slots to adapt the frame to eggs of different size, the main portions of the said plates being of greater depth than the lugs and projecting into the lower part of the frame and operating to turn the eggs and also to prevent the sides of the frame from bending inwardly, and the said plates being retained in vertical planes by the said slots.

2. In an egg turner for use in an incubator tray, a rectangular frame formed of two sides and two ends, said frame having hinges at its corners so that it can be folded flat, said frame having a series of parallel vertical slots in the upper parts of its sides, and a series of removable partition plates having lugs at the upper parts of their ends adapted to be slid interchangeably into any of the said slots to adapt the frame to eggs of different size, the main portions of the said partition plates being of greater depth than the lugs and projecting into the lower part of the frame and operating to turn the eggs and also to prevent the sides of the frame from bending inwardly, the said partition plates being retained in vertical planes by the said slots.

In testimony whereof I have affixed my signature.

WILLIAM M. GRANT.